(12) United States Patent
Beldring et al.

(10) Patent No.: US 8,871,061 B2
(45) Date of Patent: Oct. 28, 2014

(54) METHOD AND APPARATUS FOR IN-FEEDING OF MATTER TO A PROCESS REACTOR

(75) Inventors: Finn Beldring, Virum (DK); Dragan Lukic, Kgs. Lyngby (DK); Troels Hilstrøm, Herlev (DK)

(73) Assignee: Biogasol ApS (DK)

( * ) Notice: Subject to any disclaimer, the term of this patent is extended or adjusted under 35 U.S.C. 154(b) by 541 days.

(21) Appl. No.: 13/144,271

(22) PCT Filed: Jan. 12, 2010

(86) PCT No.: PCT/DK2010/050003
§ 371 (c)(1),
(2), (4) Date: Jul. 12, 2011

(87) PCT Pub. No.: WO2010/081476
PCT Pub. Date: Jul. 22, 2010

(65) Prior Publication Data
US 2011/0275860 A1 Nov. 10, 2011

(30) Foreign Application Priority Data
Jan. 13, 2009 (DK) .................................. 2009 00047

(51) Int. Cl.
| | | |
|---|---|---|
| C10B 7/10 | (2006.01) |
| D21B 1/12 | (2006.01) |
| C08H 8/00 | (2010.01) |
| D21C 7/06 | (2006.01) |
| D21B 1/34 | (2006.01) |
| D21C 11/00 | (2006.01) |
| D21C 5/00 | (2006.01) |

(52) U.S. Cl.
CPC .. D21B 1/12 (2013.01); C08H 8/00 (2013.01); D21C 11/0007 (2013.01); D21C 7/06 (2013.01); D21C 5/00 (2013.01); Y02E 50/17 (2013.01); D21B 1/342 (2013.01)
USPC .................. 202/118; 162/18; 162/28; 127/37

(58) Field of Classification Search
USPC ................ 162/23, 18, 28; 241/261.3; 127/37; 202/118
See application file for complete search history.

(56) References Cited

U.S. PATENT DOCUMENTS

| | | | |
|---|---|---|---|
| 4,720,976 A | 1/1988 | Kim et al. | |
| 4,838,995 A * | 6/1989 | Klausen | 162/18 |

(Continued)

FOREIGN PATENT DOCUMENTS

| | | |
|---|---|---|
| DE | 1045221 B | 11/1958 |
| DE | 2941504 A1 | 5/1980 |
| EP | 1775376 A2 | 4/2007 |

(Continued)

OTHER PUBLICATIONS

"International Application Serial No. PCT/DK2010/050003, International Preliminary Report on Patentability dated Jan. 17, 2011", 32 pgs.
"International Application Serial No. PCT/DK2010/050003, International Search Report mailed Mar. 29, 2010", 3 pgs.

*Primary Examiner* — Nina Bhat
(74) *Attorney, Agent, or Firm* — Schwegman Lundberg & Woessner, P.A.

(57) ABSTRACT

An apparatus for in-feeding and dewatering biomass that controls the water content of the biomass prior to introduction of the biomass into a process reactor, the in-feeding and dewatering processes being carried out at a pressure higher than or equal to the pressure inside the process reactor thereby providing the advantage of a fluid tight sealing of the process reactor and facilitating its continuous feeding.

29 Claims, 7 Drawing Sheets

(56) References Cited

U.S. PATENT DOCUMENTS

| | | | | |
|---|---|---|---|---|
| 5,176,793 A | * | 1/1993 | Kurtz | 162/4 |
| 6,039,774 A | * | 3/2000 | McMullen et al. | 48/102 A |
| 6,105,275 A | * | 8/2000 | Aulbaugh et al. | 34/424 |
| 7,300,540 B2 | * | 11/2007 | Sabourin et al. | 162/23 |
| 8,328,947 B2 | * | 12/2012 | Anand et al. | 127/37 |
| 2008/0277082 A1 | | 11/2008 | Pschorn et al. | |

FOREIGN PATENT DOCUMENTS

| | | | |
|---|---|---|---|
| WO | WO-83/02788 A1 | | 8/1983 |
| WO | WO-00/07806 A1 | | 2/2000 |
| WO | WO 2010/022511 | * | 3/2010 |

\* cited by examiner

METHOD AND APPARATUS FOR IN-FEEDING OF MATTER TO A PROCESS REACTOR

RELATED APPLICATIONS

This application is a nationalization under 35 U.S.C. 371 of PCT/DK2010/050003, filed Jan. 12, 2010 and published as WO 2010/081476 A1 on Jul. 22, 2010, which claimed priority under 35 U.S.C. 119 to Denmark Patent Application No. PA 2009 00047, filed Jan. 13, 2009; which applications and publication are incorporated herein by reference in their entirety.

FIELD OF THE INVENTION

The present invention relates inter alia to a process and apparatus for in-feeding and dewatering biomass so as to control water content in biomass before the dewatered biomass is introduced into a process reactor in order to be heat treated and subsequently fermented. Although the description of the present invention focus on biomass, it is envisaged that the invention is generally applicable to control the water content by applying a in-feed and dewatering process to a material in the form of slurry or pulp comprising mixture of a liquid and a solid matter, said material being typically in suspension in the liquid and has soaked liquid.

BACKGROUND OF THE INVENTION

Among fuels derived from plant biomass, ethanol has received particular attention as a potential replacement for or supplement to oil-derived products. Production of ethanol from biomass is normally obtained through the fermentation process of raw biological material rich in sugar or starch such as grain, sugarcane or corn also referred as first generation bio-ethanol.

To minimize the production cost and increase the potential of bio-ethanol produced from biomass, it is crucial to use lignocellulosic biomass in the form of low-cost byproducts from gardening, agriculture, forestry, timber industry and the like; thus for example, materials such as straw, maize stems, forestry waste, sawdust and wood-chips. Ethanol produced from this type of biomass is also referred to as second generation bio-ethanol.

Lignocellulosic biomass contains sugar polymers in form of hemicelluloses and cellulose. Before those sugars can be fermented to ethanol the sugar polymers has to be broken down to its sugar monomers. A common way to brake down the polymers is to use enzymatic hydrolysis. To increase the availability of the biomass to the enzymes the lignocellulosic biomass often undergoes a thermo/chemical pre-treatment.

Following a thermochemical approach such a process often requires that the temperature of the biological matter is raised to a temperature being above the boiling temperature of the liquid in which the biological matter is contained. Therefore, the skilled person is often faced with the problem of pressurising the slurry or pulp containing the biological matter so that the temperature can be increased to temperatures above the boiling temperature of the liquid while maintaining the fluid in a liquid state.

Such processes are often carried out in a container, such as a reactor chamber in which the pressure and temperature in many practical instances are elevated relatively to the atmospheric conditions while the raw biological material is stored and taken from a reservoir at atmospheric conditions. This is prone to trick safety risk and other issues relating thereto as the elevated pressure in the reactor will tend to force material upstream in the apparatus and in some cases a so-called back flash of very hot steam, ammonia, or in general chemicals and other gaseous mixtures out of the reactor and upstream in the bio-ethanol production system may occur. Such back flash may result in e.g. breakdown and destruction of the system and in some cases cause danger to humans operating the system. Thus there is a problem related to the prevention of back flash from occurring while allowing in-feed of biological material into the reactor.

In a further aspect, an efficient production system may require that the process in the reactor is carried continuously and in such aspects, there is a further problem relating to the in-feed needs to be continuous.

Suggestions as to solving this problem have been put forward. For instance, U.S. Pat. No. 4,270,976 suggests the use of a plug screw feeder to transport a pulp towards a reactor. The screw feed is constructed so that the pulp is dewatered and compacted during its transportation towards an inlet of the reactor with the aim of producing a "bio plug" that is intended to produce a seal of the reactor. This approach has turned out not to remedy the problem and requires a needy greedy control in combination of the water content, type, comminution, amount, particle size and distribution of the biomass introduced and in-feed velocity to obtain the plug. Naturally, the constitution of the raw material varies within broad limits and the end result is that safety issue has not been solved and the process is not very effective due to the produced plug does not always produce a tight seal.

In order to increase the availability of bio plug methods different hydraulic measures have been applied. For instance in WO0007806 such hydraulic measures includes a reciprocating movement of a screw feeder for providing a further compacting of the bio plug or includes a valve at the end of the screw feeder that can close the inlet to the reactor.

EP 1775376 discloses an apparatus for making wood fibres from wood chips by feeding the chips through a tamping screw comprising measuring the conductivity of a plug of chips leaving the screw and using the result as a control parameter for controlling downstream processing of the chips and/or fibres.

Thus, until now the back flash problem from reactor into the system has not yet been overcome effectively and the present invention seeks at least mitigating some of the problems related thereto.

Hence, an improved in-feed apparatus in which back-flash and upstream of processed material is safely avoided while continuous in-feed is achievable would be advantageous.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide an apparatus which has the function of in-feeding and dewatering biomass before the dewatered biomass is introduced into a process reactor. In the apparatus these processing, i.e. in-feeding and dewatering are carried out at a pressure higher than or equal to the pressure inside the reactor.

It is a further object of the present invention to provide an advantageous alternative to the prior art by providing an in-feed apparatus in which in-feeding is carried out in a continuous mode.

The present invention relates to an apparatus, which can be part of a pre-treatment system in a plant for the production of bio-ethanol. The apparatus has the function of in-feeding and dewatering biomass so as to control water content in biomass before the dewatered biomass is introduced into a process reactor, e.g. a gasification reactor. The in-feeding and dewatering processes are carried out at a pressure higher than or equal to the pressure inside the reactor and therefore solving the back flash problem and providing an alternative to the "bio-plug" referred in the prior art.

Maintaining the pressure inside the in-feed apparatus at a pressure higher than or equal to the pressure inside the reactor has the advantage of producing a fluid tight sealing of the reactor induced by the pressure difference avoiding any back-flash and material flow upstream into the bio-ethanol production system. A main difference with the "bio-plug" system referred to in the prior art is that the invention provides an easy security system which physically prevents a back flash of steam.

A further advantage of the pressurisation of the in-feed apparatus is that this facilitates the continuous feeding by for example, avoiding the need of a gate system.

An even further advantage of the apparatus is that the biomass in the in-feed may provide a thermal barrier for the reactor, e.g. a thermal pretreatment of a biogas plant.

The apparatus may receive biomass previously reduced to pulp or slurry by a pre-processing system which includes means for comminuting, soaking biomass, i. e. producing a pulp. Comminution is used herein to denote the process of reducing to small pieces or particles. Pulp is herein used to denote a mixture of material fibres and a fluid, usually water. Slurry is herein used to denote a suspension of insoluble particles usually in water.

Although the description of the present invention focus on biomass, it is envisaged that the invention is generally applicable to control the water content by applying an in-feed and dewatering process to a material in the form of slurry or pulp comprising mixture of a liquid and a solid matter, said material being typically in suspension in the liquid and has soaked liquid.

The object and several other objects of the invention are achieved by providing, in a first aspect an in-feed apparatus for feeding a material contained in a liquid into a reactor, said in-feed apparatus comprising: i) a container comprising a material inlet to introduce said material into the container and a material outlet to feed said material into a reactor; ii) pressurisation means for pressurising the material so that said material when inside the container is pressurized, iii) transportation means for transporting the material from the material inlet to the material outlet to feed said material into a reactor, iv) at least a liquid outlet to discharge a liquid outside the container, wherein the pressurisation means is or are adapted to provide a pressure inside the container higher than or at least equal to the pressure inside the reactor.

In-feed is herein defined as the action or process of supplying material to a machinery to be further processed mainly involving transportation of the material but also partial processing of the material, e. g. reducing its liquid content. Transportation of the material may be carried out by active or passive transportation means.

In some embodiments transportation of the material may be carried out by a passive transportation means so that the transportation is provided by the negative inclination of the container. In this case the apparatus according to the invention is positioned with a certain degree of negative inclination in respect to the direction of the flow of the material between the material inlet and the material outlet. The negative inclination facilitates the flow of the material from the material inlet towards the material outlet by means of gravity.

In another embodiment transportation of the material may be carried out by an active transportation means such as a convey screw.

The convey screw may be powered by a variable speed motor and provide forced transportation of the material towards the material outlet by rotational movement along its axis.

In some embodiments the transportation means of the in-feed apparatus according to some of the embodiments of the invention is adapted to provide a transport of said material at constant speed.

In another embodiment the transportation means of the in-feed apparatus according to the invention, is or comprise a progressive cavity pump. The use of a progressive cavity pump may provide an advantage to the apparatus as pre-heating of the fed material may be carried out in the in-feed apparatus after having pressed the soaking water out of the material. As the in-feed apparatus may be under a pressure above the atmospheric pressure, this pre-heating may be achieved using super-heated water, i. e. water heated to a temperature higher than its boiling point, e. g. 140° C. Super-heated water may be produced by using heat which otherwise would be wasted, e. g. employing the heat produced by exothermic hydrolization processes downstream in the bio-ethanol production plant.

In some preferred embodiments according to the invention transportation means is or comprise dewatering means such as a screw press.

In this case transportation of the material and dewatering are carried out at the same time by for example a screw press. The movement of the screw press reduce the liquid content of the material and at the same time transport the material towards the material outlet.

In another embodiment transportation and dewatering are decoupled and carried out respectively by two different devices, e. g. a screw press which compresses and squeezes a liquid out of the material after the material inlet and a convey screw transporting the dewatered material towards the material outlet, respectively.

In other embodiments the in-feed apparatus according to the first aspect of the invention, further comprises inside said container means for dewatering the material to be fed in said reactor.

Dewatering of the inserted material may be carried out in combination with its transportation, as described above or separately. Means for dewatering is or comprise for example a rotating worm conveyor. The rotating worm conveyor compresses the material to be dewatered into an area of the container where the liquid compressed out is discharged.

In another embodiment means for dewatering is or comprise a reciprocal piston. In this embodiment the motion of the piston is synchronised with the insertion of the material through the material inlet. After insertion the reciprocal movement of the piston compress the material pushing out the water before leaving space for the introduction of further material.

In a further embodiment means for dewatering is or comprise a pulsating compressing screw. The combination of a pulsating movement during the compression induced by a screw provides a more efficient dewatering of the material, which take advantage from the effect that is achieved when to a hard compression follows a less hard compression.

In further embodiments dewatering may be carried out by a filter belt conveyor where the difference in pressure between the two opposite sides of the belt allows for separation between the solid content of the material, which remains on the belt and the liquid contained in material, which is collected on the other side of the filter.

A further example of dewatering may also be a rotating separator, e. g. a centrifuge.

In general dewatering means reduce(s) the solvent content, such as water content of said material to 60%, more preferably 40%, even more preferably 10% wt %.

As used herein the water content is defined as weight percent, or simply wt %, as the weight of the water in respect to the weight of the material, i. e. wt/wt %. For example 60% water content means that 60% of the material is water and the other 40% is dry matter.

In other embodiments the dewatering means reduce(s) the solvent content, such as water content of the material to 90%, more preferably to 85%, even more preferably to 80% wt %. Higher moisture content may be advantageous for specific applications, e.g. for feeding of gasification reactor.

The apparatus may also operate with a material with a dry solid content between 0 and 100%.

The dry matter may be dissolved or not dissolved, i.e. in suspension in the solvent, for example fibres suspended in oil.

In further embodiments the in-feed apparatus according to the invention, may preferably comprise a plurality of perforation along the internal wall of said container and passage means connecting said perforation to said outlet of a liquid. These perforations may have different shape and size and form a material proof grid which allows the diffusion of water outside while retaining the material inside the container.

In some embodiments the in-feed apparatus according to the invention, may preferably comprise a re-circulation loop so that the liquid discharged through said outlet of liquid is re-used in pre-in-feed treatment of the material.

Recirculation and reuse of all the streams produced in the production of biofuel is crucial in order to maximize the amount of bio-ethanol and minimize the disposal of process water. The presence of a re-circulation loop allows the discharged liquid, such as water, to re-enter the process as it can be used as soaking water in the first treatment of the material before entering the in-feed apparatus.

In other embodiments the in-feed apparatus according to the invention, further comprises means for maintaining the pressure of the discharged liquid higher than the atmospheric pressure.

The advantage of discharging liquid at high pressure can be used for purification of the liquid before the re-insertion in the production process. For example the high pressure can be used as a driving force for separating solute from a solution by using a membrane, e. g. a ultrafiltration or reverse osmosis membrane that retains the solute on one side and allows the pure liquid to pass to the other side, rendering it sufficient purified to be re-used in the production process.

In further embodiments the in-feed apparatus according to the invention, further comprises filtration means for reducing the undesired content in the discharged liquid for example before entering the re-circulation loop.

Filtration means are herein defined as efficient filtering means pressure driven, e. g. reverse osmosis membrane, are gravity driven, e.g. sieve with different mesh size, or chemically induced, e. g. ion exchange resins.

Undesired content is herein defined as the matter or the elements, e. g. metal ions like $Na^+$ or $K^+$, which may inhibit the further processing of the material, e. g. hydrolization and fermentation.

The reduction of the undesired content in the discharged liquid before entering the re-circulation loop have therefore the advantage of maximizing the bio-ethanol production by increasing the efficiency of the process.

In even further embodiments the in-feed apparatus according to the first aspect, further comprises at least a liquid inlet to introduce a liquid into the container. The presence of such a liquid inlet allows a fine control of the liquid content of the material introduced into the apparatus. For example regulated introduction of a liquid, such as fresh water, can be envisaged in the cases where, due to the particular nature of the material introduced, excessive de-watering took place. This feature also allows for introduction of flushing/washing liquid for washing undesired content out of the material or for flushing the system during maintenance operation. For example undesired content may be salts, silicates or other minerals which may be present in the biomass. This content may cause corrosions of reactors within the system as well as may precipitate and obstruct filters or distillation columns along the system. The advantage of introducing a flushing/washing liquid is that allows for a rinsing/washing operation of the material, e.g. biomass, following the removal of most of the soaking water from the system therefore removing all the undesired content from the biomass. The presence of a washing operation may be advantageous in specific application of the apparatus for example for washing straw to be fed into a combustion power plant.

In one embodiment the in-feed apparatus according to the invention further comprises monitoring means for monitoring the moisture of the material to be fed in the reactor.

Monitoring means are for example electronic moisture sensor which located inside the container once in contact with the material provides information about the amount water contained in the material.

In another embodiment the in-feed apparatus according to the invention further comprises automated means for responding to the output of said monitoring means for controlling the amount of liquid inserted through said liquid inlet and the amount of liquid discharged through said liquid outlet.

For example low moisture conditions detected by an moisture sensor inside the container triggers a response, by transmitting data through the container, which allows insertion of a liquid though the liquid inlet. Once the desired moisture condition is achieved and detected by the sensor liquid a correspondent response is triggered and insertion of liquid is stopped.

In another embodiment according to the invention pressurisation means is or comprise at least one pump.

The pressure inside the container can be provided by one or more pumps. For example the pressure may be provided by the pump, such as a displacement pump or a centrifugal pump, which forces the material towards the material inlet and into the container, herein referred as material inlet pump.

The pressure inside the container may be also provided by a separate gas pressure means, e. g. for atmospheric pressure an air compressor.

Supplying the container with a pressure, which is higher than the pressure inside the reactor, gives also the advantage of providing a downstream and more efficient heat isolation of the reactor.

In other embodiments the in-feed apparatus according to the invention comprises an external housing of said in-feed apparatus.

This external housing may provide extra security in avoiding any back-flash and material flow upstream into the bio-ethanol production system.

In other embodiments the pressurisation means is or comprise at least one pump providing a pressure inside said external housing higher than or at least equal to the pressure inside the reactor.

The pressure difference between the reactor and the in-feed apparatus may also be sustained by a pump, such as an air compressor which keep the pressure of the external housing of the in-feed apparatus higher than or at least equal to the pressure inside the reactor providing a fluid tight sealing of the reactor.

In some embodiments the pressurisation means is or comprise at least one pump providing a pressure inside said container higher than or at least equal to the pressure inside the reactor.

The pressure inside the container can be provided by a material inlet pump and/or one or more secondary pumps.

In a further embodiment the pressurisation means comprise at least one pump providing a pressure inside said container higher than or at least equal to the pressure inside the reactor and at least one pump providing a pressure inside said external housing higher than or at least equal to the pressure inside the reactor.

The main pressure difference between the in-feed apparatus and the reactor may be provided by pressurisation means providing a pressure inside the container, while keeping the external housing at a pressure higher than or equal to the pressure inside the reactor may provide an auxiliary security in avoiding any back-flash.

In further embodiments the in-feed apparatus material inlet comprises a valve such as a check valve.

The presence of a valve allows for control of the pressure inside the apparatus. Pressurization of the biomass inside the apparatus may be also partially provided by the dewatering means through the formation of, for example, a bio-plug. Therefore the dewatering process may contribute to the pressurization of the biomass to be fed into the reactor.

In some embodiments the in-feed apparatus according to the invention comprises means for adding chemical agents to the dewatered material.

In other embodiments the in-feed apparatus according to the invention further comprises means for adding chemical agents so that the addition provides variation in the acidity of the material.

The object and several other objects of the invention are achieved by providing, in a second aspect, a system for producing bio-products from bio-mass, the system comprising: i) a pre-processing subsystem for collecting, transporting, reducing to pulp, comminuting and delivering the material to an in-feed apparatus, ii) said in-feed apparatus according to any of the preceding claims, iii) a reactor for changing chemical and/or physical structure, of said material.

One embodiment according to the second aspect of the invention is a system for producing bio-ethanol.

In a third aspect the object and several other objects of the invention are achieved by a method for reducing the water content of a material to be fed into a reactor, said method utilizing an in-feed apparatus according to any of the preceding claims.

In a fourth aspect the object and several other objects of the invention are achieved by a method for continuous feeding of a material into a reactor said method utilizing an in-feed apparatus according to any of the preceding claims.

The first, second and third and fourth aspect of the present invention may each be combined with any of the other aspects. These and other aspects of the invention will be apparent from and elucidated with reference to the embodiments described hereinafter.

In the present context a number of terms are used in a manner being ordinary to a skilled person. However, in order to specify features comprised in some of terms a general definition on some of the terms are presented below.

BRIEF DESCRIPTION OF THE FIGURES

The method and apparatus for in-feed of matter to a process reactor according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
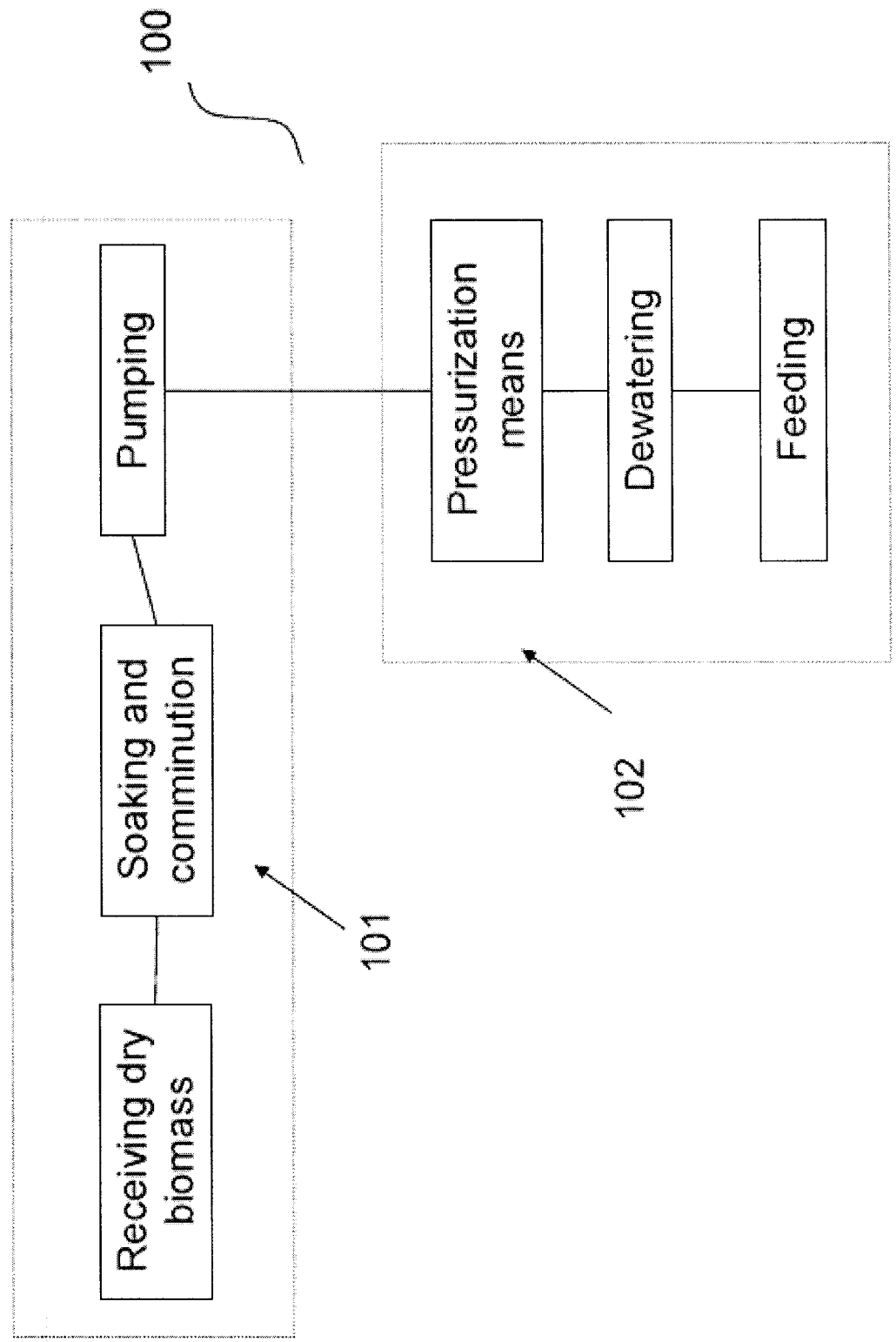
FIG. 1 shows a block diagram of a biomass pre-treatment system including a pre-processing and in-feed to a process reactor sub-system, showing the in-feed subsystem having pressurising, dewatering and feeding functionality according to the invention.

FIG. 1 shows a block diagram of a biomass pre-treatment system 100 having two major subsystems, namely a pre-processing 101 and an in-feeding 102 to a process reactor. The pre-processing 101 includes means for receiving a dry biomass, soaking and comminuting means of said biomass, i. e. producing a pulp and pumping means for delivering said pulp. The in-feed apparatus 102 according to the invention includes pressurization means for maintaining a pressure higher than the atmospheric pressure, de-watering means for reducing the water content of said pulp and transportation means to feed said pulp into a process reactor.

Figure 2:
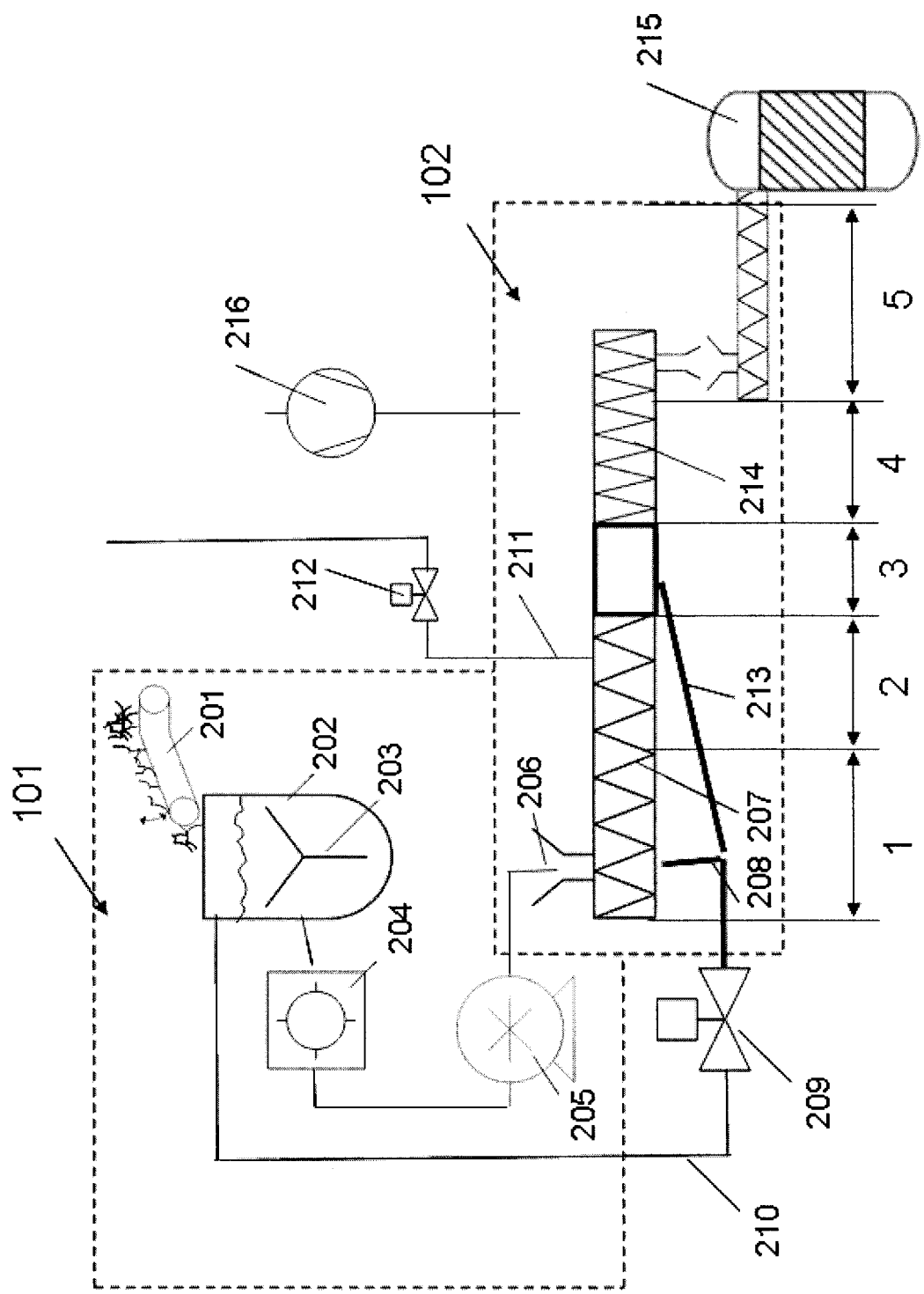
FIG. 2 shows a schematic representation of a biomass pre-treatment system including an apparatus for in-feeding matter to a process reactor according to the invention.

In FIG. 2 a schematic representation of biomass pre-treatment system including an apparatus for in-feeding matter to a process reactor according to the present invention is disclosed in further details with respect to the various elements. In the pre-processing subsystem 101 the biomass is collected and transported, e. g. through a convey 201, and introduced into a soaking tank 202. In the soaking tank water and biomass, such as straw are mixed by means, e. g. a vortex 203, and reduced to a pulp. A cutter 204, e. g. a rotating disc, comminutes the pulp and a pump 205, e. g. a displacement pump, drives the pulp into the in-feed apparatus 102. The in-feed apparatus 102 comprises an inlet for the pulp and dewatering zone 1, a washing zone 2 for diluting/adding/washing the pulp with a liquid, a pressing zone 3, a decompression and transport zone 4 and an in-feed zone 5 for in-feed the dewatered and washed pulp to the process reactor.

In the in-feed apparatus 102, following pulp introduction through a conduit 206 dewatering is carried in the dewatering zone 1 by a dewatering means 207, such as a pressing screw. The soaking water pressed out of the pulp is collected through a conduit 208 and may become part of a water re-circulation loop and re-used as soaking water through a valve 209 and a conduit 210. The dewatering means 207 dewater and transport the pulp into the washing zone 2 where a washing liquid, e. g. water, is introduced through a conduit 211 and regulated by a valve 212. The washing liquid, further pressed out of the pulp in the pressing zone 3, is collected through a conduit 213. In the case in which said liquid is water, this is collected together with the soaking water for re-use. The soaking water as well as the washing water is discharged at high pressure and may be further processed by filtration means in order to reduce its solid or salt content before re-use. From the pressure zone 3 the pulp is driven through the decompression and transportation zone 4 by transportation means 214, e.g. a transport screw, to the in-feed zone 5 before the process reactor 215.

In the embodiment shown in the figures, the process pressure of the in-feed apparatus 102 is established by pressurization means 216, e. g. an air compressor which apply a pressure to the external housing (not shown) of the in-feed apparatus 102. However, the pressurization means 216 may be omitted and the pressurisation carried out by the pump 205 which forces pulp into the in-feed apparatus 102.

The presence of high pressure induced by the pressurization means 216 or the pump 205 upstream of the reactor provides an impediment to back flash of very hot steam, ammonia, or in general chemical and other gaseous out of the reactor and upstream in the system. By regulating the pressure in the in-feed apparatus it is possible to avoid pressure difference between the in-feed and the reactor, difference which generally trigger said back flash.

Figure 3:
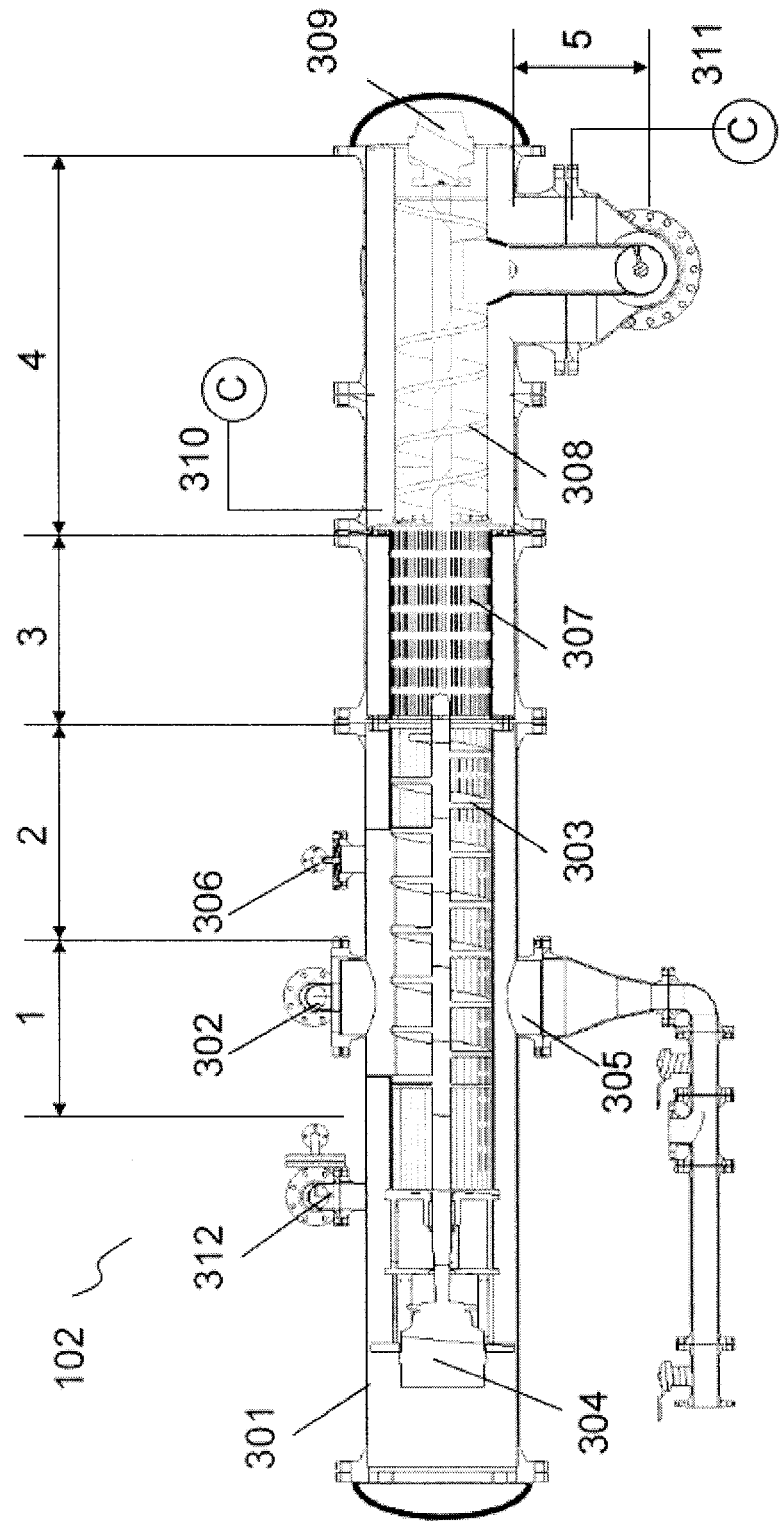
FIG. 3 shows a cross section of the in-feed apparatus in details according to one embodiment of the invention.

FIG. 3 shows a cross section of the in-feed apparatus 102 in details according to one embodiment of the invention. The in-feed apparatus comprises a container 301, such as a tubular casing, which includes an inlet for the pulp and dewatering zone 1, a washing zone 2 for diluting/adding/washing the pulp with a liquid, a pressing zone 3, a transport zone 4 and an in-feed zone 5 for in-feed the washed and compacted pulp to the process reactor.

The pulp is introduced into the dewatering zone 1 through a conduit 302 and dewatered by a screw type dewatering device 303 powered by a variable speed motor 304. The screw type dewatering device 303, in general terms is arranged for advancing a mass of material in a generally axial direction away from the conduit 302 and towards the washing zone 2. The soaking water pressed out of the pulp is discharged through a conduit 305 and provides a source of water at high pressure which may be re-used after, e. g. filtration, as soaking water in the first step of the process. The de-watered pulp carried by the screw 303 can be washed with washing liquid, e. g. fresh water, in the washing zone 2. The moisture content of the pulp can be regulated by controlled addition of fresh water through conduit 306. The screw type dewatering device 303 provides an effective mixing of the pulp and washing liquid. The added water is further pressed out in the pressing zone 3 and discharged through perforations 307 to be collected for re-use. Generally the pulp entering conduit 302 with a dry matter content of 6% increases his dry content up to 25-60% in the pressing zone 3. Following the pressing zone 3 the dry-pressed pulp is de-compressed and fluffed up into small pulp fibres by a convey screw 308 in the de-compressing and transport zone 4. The convey screw 308 is powered by a variable speed motor 309 and provide transportation of the fluffed pulp into the feeding zone 5 where the pulp is fed to the process reactor (not shown).

With reference to FIG. 3, liquid or gaseous chemicals such as hydrogen peroxide may optionally be introduced into the decompression and transport zone through conduit 310 or in the in-feed zone though conduit 311.

Pressurization of the in-feed apparatus 102 may be carried out by the pump (not shown) forcing the pulp into the in-feed apparatus through conduit 302. Pressurization may also be provided though conduit 312 by one or more secondary pump (not shown). The whole in-feed apparatus 102 may be pressurized at a pressure higher than or equal to the pressure inside the reactor though pressurization means which keep such a pressure inside the external housing (not shown) of the in-feed apparatus 102.

Figure 4:
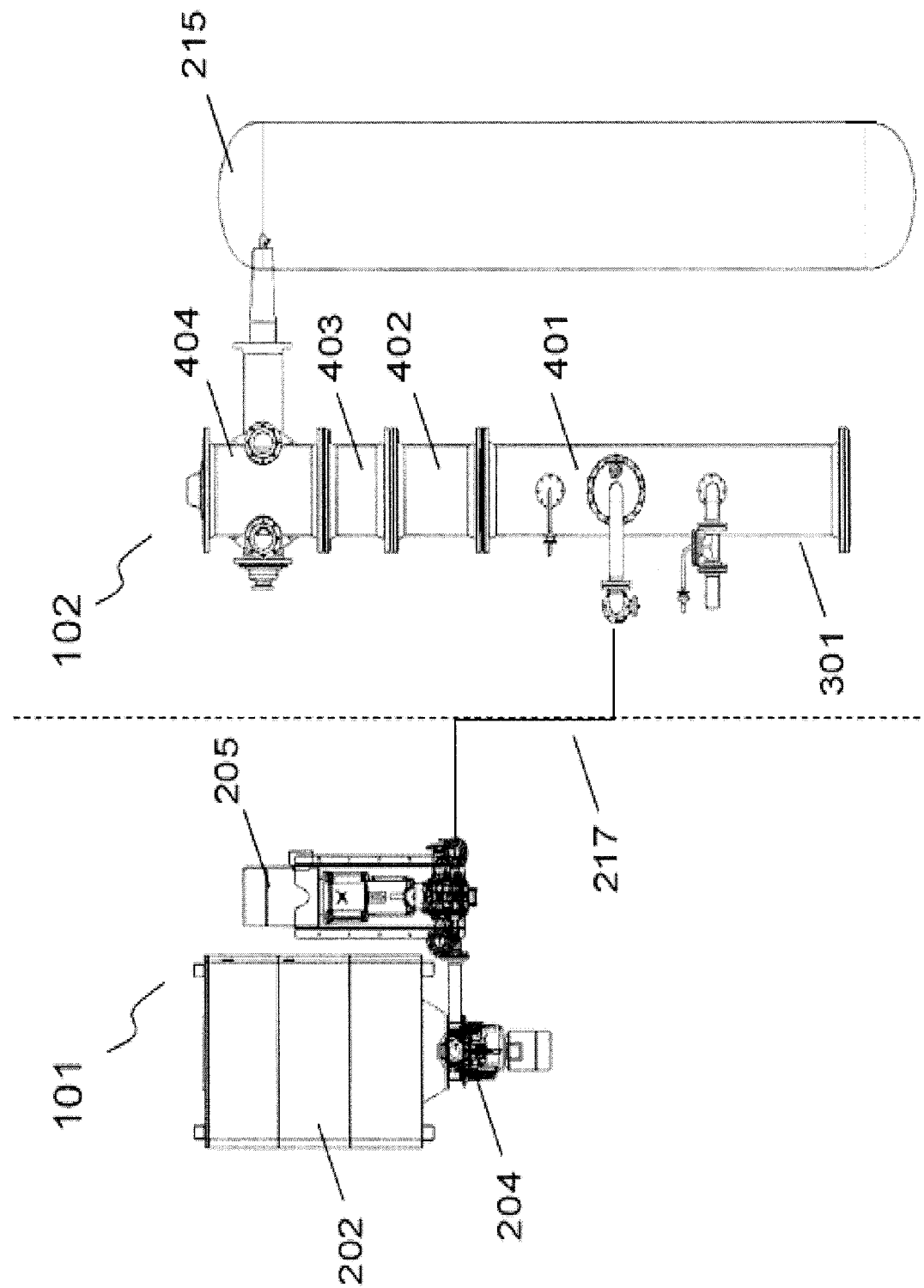
FIG. 4 shows various elements according to one embodiment of the present invention.

FIG. 4 shows cross sectional view of the various elements according to one embodiment of the present invention including a soaking tank 202, a cutter 204, a displacement pump 205 and a connection 217 between the displacement pump 205 and the in-feed apparatus 102 and a process reactor 215. In this embodiment the container 301 of the in-feed apparatus is shown divided in 4 sections which can be identified with the section corresponding to the dewatering and washing zone 401, the pressing zone 402, the decompression and transport zone 403 and the in-feed zone 404. With reference to FIG. 4 as an optional embodiment the in-feed apparatus comprises all the mentioned zones inside a single container instead in separate connected containers as shown by FIG. 4.

Figure 5:
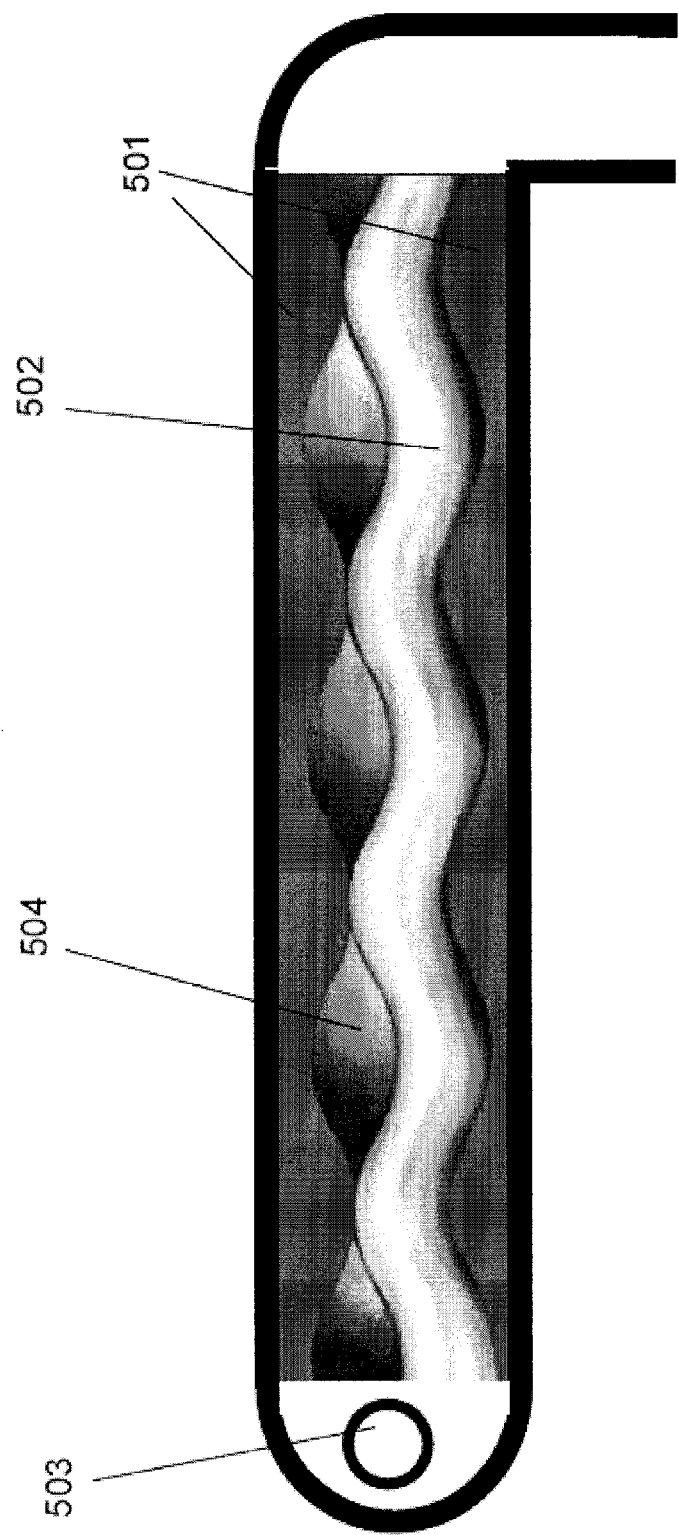
FIG. 5 shows a cross-sectional view of a preferred embodiment according to the invention where transportation of the material is carried out by a progressive cavity pump.

FIG. 5 shows a cross-sectional view of a preferred embodiment according to the invention where transportation of the material is carried out by a progressive cavity pump. In the embodiment shown in FIG. 5 the pumping element comprises a single helix rotor 502 and a double helix stator 501. The single helix rotor 501 may be made of a metallic material, while the stator 501 may be made of an elastic polymer material, such as an elastomer. Due to the special profile of the rotor 502 and stator 501, a sealing line is formed along the axis of the rotor, which is maintained at static or dynamic condition. As the rotor 502 turns within the stator 501, the cavities 504 progress from the material inlet 503 towards the material outlet carrying the material through the in-feed apparatus towards the process reactor.

Figure 6:
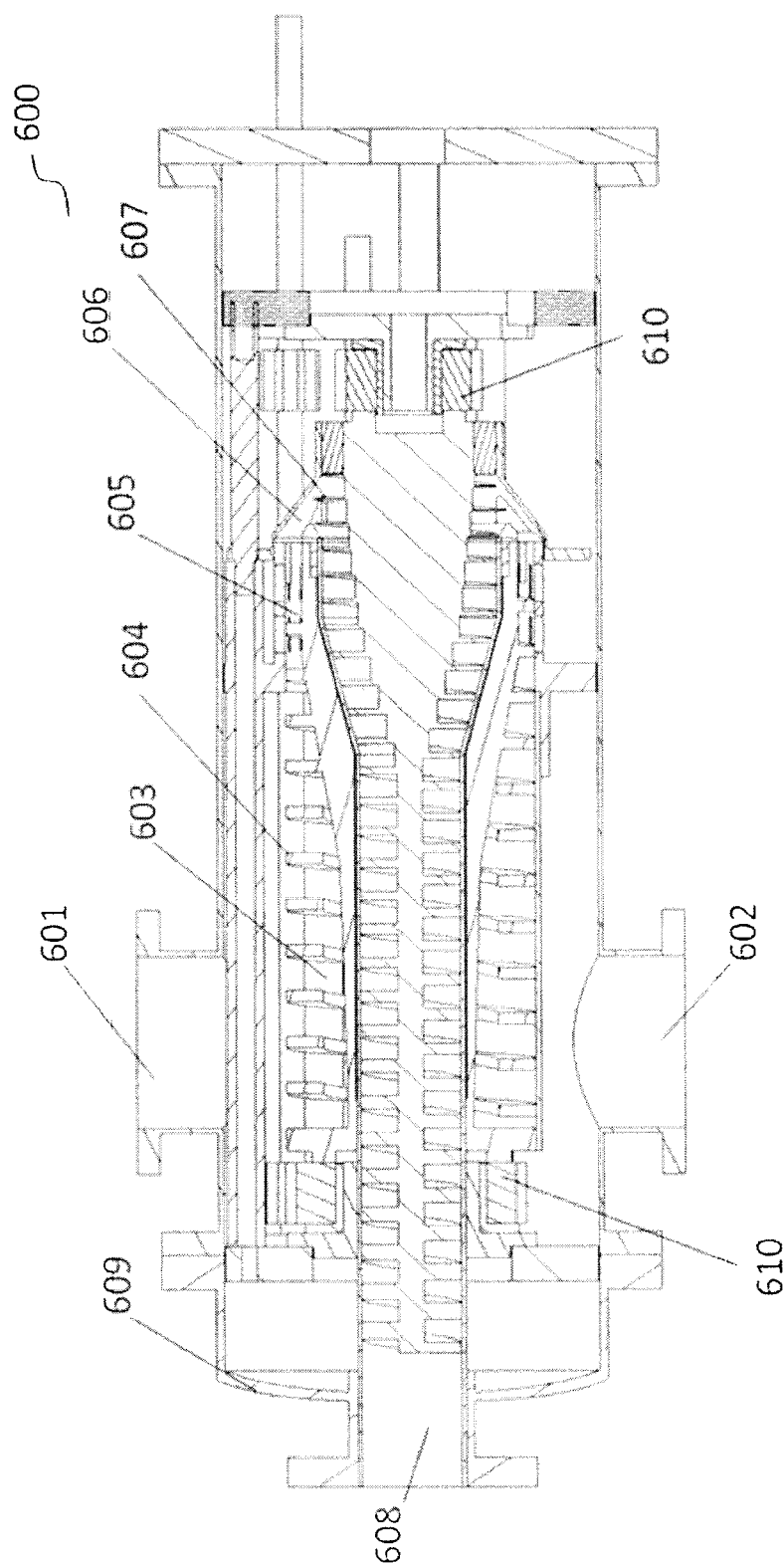
FIG. 6 shows a cross section of the in-feed apparatus according to another embodiment of the invention.

FIG. 6 shows a cross section of the in-feed apparatus 600 according to another embodiment of the invention where the transportation of the material is carried out by a two screws system.

In this embodiment a casing 609 comprises an inlet 601 for pulp, an outlet 608 for the dewatered pulp and an outlet 602 for discharging the water released by the pulp. The pulp is introduced into the apparatus 600 through inlet 601 and transported and is firstly dewatered via screw 604. This first dewatering mostly occurs by means of gravity and pressure. The water released by the pulp during dewatering pass though a net system 603 and is discharged though outlet 602. The water discharged may be re-used after, e.g. filtration, as indicated in previous embodiments. The screw 604 is, in general terms arranged for advancing a mass of material, e.g. the pulp, in a generally axial direction away from the inlet 601, towards a dewatering zone 605 where the pulp is pressed during its transport. The pulp through a transport element 606 is then is put in contact with an in-feed screw 607 which is arranged for advancing a mass of material, e.g. the pulp, in a generally axial direction opposite to the one of screw 604.

In-feed screw 607 transports the dewatered pulp towards the outlet 608 in the direction of the reactor inlet (not shown). Screw 604 and in-feed screw 607 provide transport of the pulp through their rotation on, e.g. gearwheels 610.

Figure 6A:
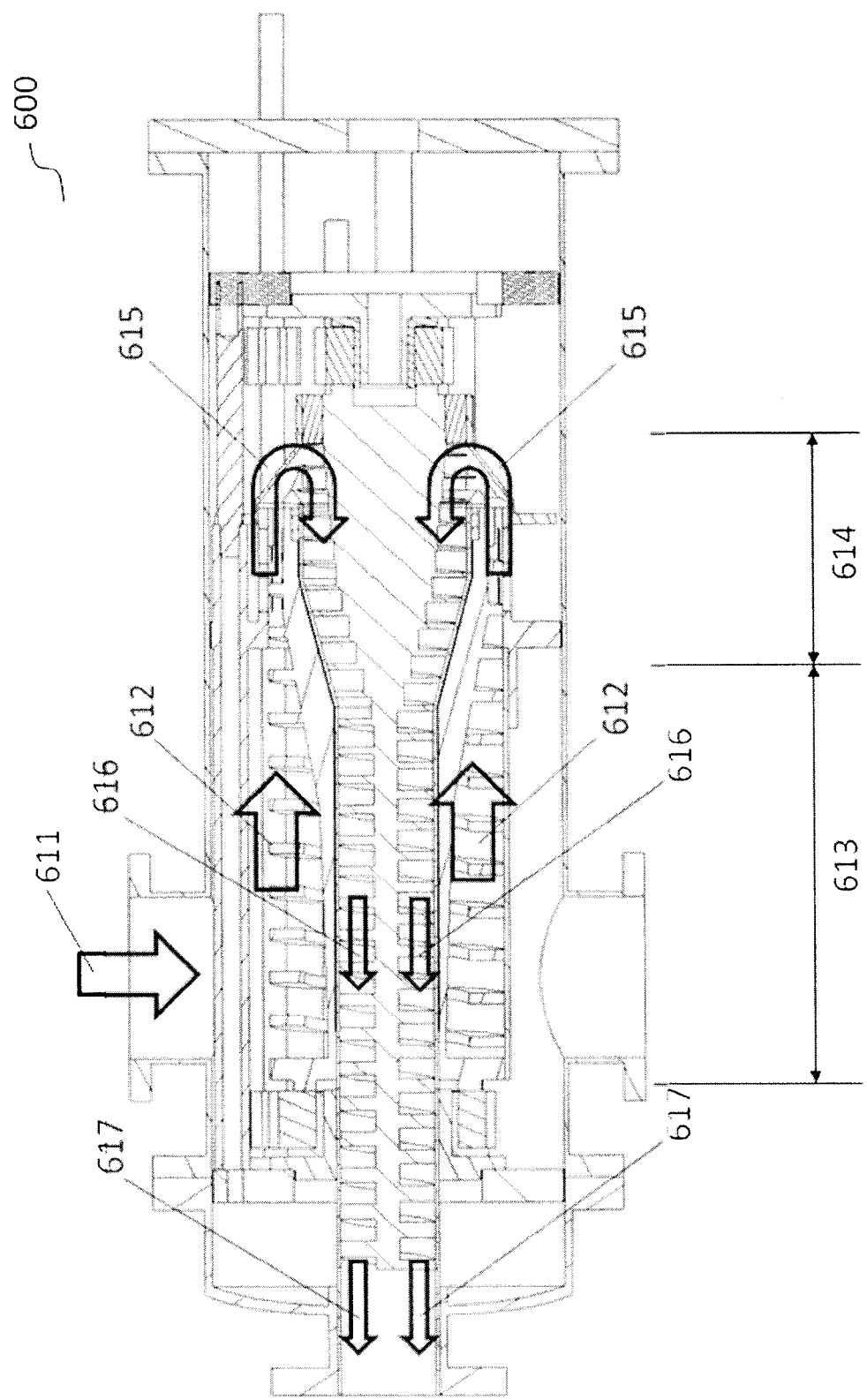
FIG. 6a shows the flow of pulp through the in-feed apparatus according to the embodiment of the invention shown in FIG. 6.

FIG. 6a shows the flow of pulp through the in-feed apparatus. The pulp enters the apparatus 600 following arrow 611 and is transported and dewatered following arrows 612 via screw 604 through a dewatering/washing zone 613 where it is mostly dewatered by means of gravity and pressure. The pulp moves into a second dewatering zone 614 where is mostly dewatered by means of pressure. Following arrows 615 the pulp is fed through an in-feed screw 607 towards the outlet 608 of the apparatus along arrows 616. From the outlet 608 the pulp, following arrows 617 is fed to the reactor.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An apparatus for producing bio-products from biomass material, said apparatus comprising an in-feed apparatus and a reactor, the in-feed apparatus being for feeding a biomass material contained in a liquid into said reactor, said in-feed apparatus comprising:
   a pressurisable external housing defining an interior;
   a container housed within the external housing, comprising a material inlet to receive said biomass material into the container and a material outlet connected to feed said biomass material into said reactor;
   pressurisation means for pressurising the interior of said housing and for pressurising the biomass material so that said biomass material when inside the container is pressurized;
   a transportation means transporting the biomass material from the material inlet to the material outlet to feed said biomass material into said reactor;
   inside said container means for dewatering the biomass material prior to feeding into said reactor
   a liquid outlet discharging from said container liquid removed from the biomass by said dewatering means.

2. The apparatus according to claim 1, wherein the pressurisation means includes means for pressurising the interior of the housing that comprises at least one pump capable of providing a pressure inside said external housing higher than or at least equal to pressure inside the reactor in use.

3. The apparatus according to claim 1, wherein the pressurization means includes pressurisation means for pressurising the biomass material that comprises at least one pump capable of providing a biomass pressure inside said container higher than or at least equal to pressure inside the reactor in use.

4. The apparatus according to claim 1, wherein the pressurisation means comprise at least one pump capable of providing a pressure inside said container higher than or at least equal to pressure inside the reactor in use and at least one pump capable of providing a pressure inside said external housing higher than or at least equal to pressure inside the reactor in use.

5. The apparatus according to claim 3, wherein the pressurization means for pressurising the biomass material is or comprises a displacement pump.

6. The apparatus according to claim 3, wherein the pressurization means for pressurising the biomass material is or comprises a centrifugal pump.

7. The apparatus according to claim 1, wherein said material inlet comprises a check valve.

8. The apparatus according to claim 1, wherein said means for dewatering is or comprises a rotating worm conveyor.

9. The apparatus according to claim 1, wherein said means for dewatering is or comprises a reciprocal piston.

10. The apparatus according to claim 1, wherein said means for dewatering is or comprises a pulsating compressing screw.

11. The apparatus according to claim 1, wherein said transportation means is a passive transportation means such that the transportation is provided by the negative inclination of said container.

12. The apparatus according to claim 1, wherein said transportation means is an active transportation means.

13. The apparatus according to claim 12, wherein said transportation means is a conveyor screw.

14. The apparatus according to claim 12, wherein said transportation means is adapted to provide a transport of said biomass material at constant speed.

15. The apparatus according to claim 1, wherein said transportation means is or comprises a progressive cavity pump.

16. The apparatus according to claim 1, wherein said transportation means comprises dewatering means.

17. The apparatus according to claim 1, wherein a plurality of perforations are provided along an internal wall of said container and the apparatus comprises passage means connecting said perforations to said liquid outlet.

18. The apparatus according to claim 1, further comprising a re-circulation loop so that the liquid discharged through said outlet of liquid is re-used in pre-in-feed treatment of the biomass material.

19. The apparatus according to claim 1, further comprising means for maintaining the pressure of the discharged liquid higher than atmospheric pressure.

20. The apparatus according to claim 1, further comprising filtration means for reducing undesired content in the discharged liquid.

21. The apparatus according to claim 1, further comprising monitoring means for monitoring the moisture of the biomass material to be fed in the reactor.

22. The apparatus according to claim 21, further comprising automated means for responding to the output of said monitoring means for controlling the amount of liquid inserted through said material inlet with said biomass material into said container and the amount of liquid discharged through said liquid outlet.

23. The apparatus according to claim 1, further comprising means for adding chemical agents to the dewatered biomass material.

24. The apparatus as claimed in claim 1, wherein the pressure inside the external housing and the pressure inside the container are both higher than or equal to the pressure inside the reactor.

25. An in-feed apparatus for receiving, dewatering and feeding a biomass material contained in a liquid into a reactor, said in-feed apparatus comprising:
   a pressurisable external housing;
   a container housed within the external housing, said container comprising a material inlet to receive said biomass material contained in said liquid into the container and a material outlet connectable to feed said biomass material from said in-feed apparatus to a reactor;
   a first pressurisation means for pressurising the biomass material so that said biomass material when inside the container is pressurized;
   a second pressurisation means for pressurising said external housing;

a transportation means transporting the biomass material from the material inlet to the material outlet of the container;

inside said container means for dewatering the biomass material prior to exit from said container;

a liquid outlet for discharging from said container liquid removed from the biomass by said dewatering means.

26. A method for producing bio-products, from biomass material, the method comprising:
- i) in a pre-processing subsystem, collecting, transporting, reducing to pulp, comminuting and delivering said biomass material to an in-feed apparatus,
- ii) feeding the biomass material contained in a liquid, from said in-feed apparatus into a reactor,
- iii) treating said biomass material in said reactor whereby the chemical and/or physical structure of said biomass material is changed, said in-feed apparatus comprising:
- a pressurised external housing,
- a container housed within the external housing and comprising a material inlet by means of which said biomass material is introduced into the container and a material outlet by means of which said material is fed into said reactor,
- pressurisation means pressurising the external housing and pressurising the biomass material so that said biomass material when inside the container is pressurized,
- transportation means transporting the biomass material from the material inlet to the material outlet whereby said biomass material is fed into the reactor,
- inside said container, means dewatering the biomass material prior to feeding into said reactor, and discharging liquid produced by said dewatering to outside of the container via a liquid outlet,
- whereby, by means of the pressurization means, a pressure is provided inside the container higher than or at least equal to the pressure inside the reactor, and a pressure is also provided inside the housing higher than or at least equal to the pressure inside the reactor.

27. A method according to claim 26, wherein operating of said dewatering means reduce(s) the liquid content of said biomass material to no more than 60 wt %.

28. A method according to claim 26, wherein in the pre-processing subsystem, the pulp is comminuted by means of a cutter and subsequently the comminuted pulp is forced into the in-feed apparatus by a displacement pump.

29. A method according to claim 26, wherein the bio-product produced from biomass is bio-ethanol.

* * * * *